Nov. 20, 1923.

H. G. STEELE 1,474,563

HOLDER FOR NONSKID CHAINS

Filed Feb. 3, 1923

Inventor
HARNEY G. STEELE.
By Watson E. Coleman
Attorney

Patented Nov. 20, 1923.

1,474,563

UNITED STATES PATENT OFFICE.

HARNEY G. STEELE, OF JOHNSTOWN, PENNSYLVANIA.

HOLDER FOR NONSKID CHAINS.

Application filed February 3, 1923. Serial No. 616,751.

*To all whom it may concern:*

Be it known that I, HARNEY G. STEELE, a citizen of the United States, residing at Johnstown, in the county of Cambria and State of Pennsylvania, have invented certain new and useful Improvements in Holders for Nonskid Chains, of which the following is a specification, reference being had to the accompanying drawings.

This invention relates to non-skid chains for automobile and truck tires, and more particularly to means for holding in place the cross chains which extend over the tread of the tire.

One of the objects of this invention is to provide a device of this character which is so constructed that the chain holding portion of the device may be more or less permanently attached to the wheel and be kept on the wheel either continuously or at least through the season during which non-skid chains are likely to be used.

A further object is to so construct the holding means that the cross chains may be quickly connected to or disconnected from the holding device.

A still further object is to provide a device of this character which will hold the chains so that they shall extend equally on both sides of the tire and felly of the wheel.

Another object is to provide a holder of this character which, as before remarked, may be more or less permanently attached to the wheel itself and which is not ordinarily removed from the wheel, and which is so formed that those parts which are directly engaged by the terminal members of the cross chains are resilient and may be shifted radially outward by the use of a suitable tool in case a cross chain should be slightly short in length or difficult to engage or disengage from the holding device.

Still another object is to provide means for holding the cross chains which will permit the cross chains to shift over the tread face of the tire or oscillate over this tread face to some extent so as to prevent the cross chains from wearing the tire at one point or biting into the tire.

Other objects will appear in the course of the following description.

My invention is illustrated in the accompanying drawings, wherein:—

Figure 1:
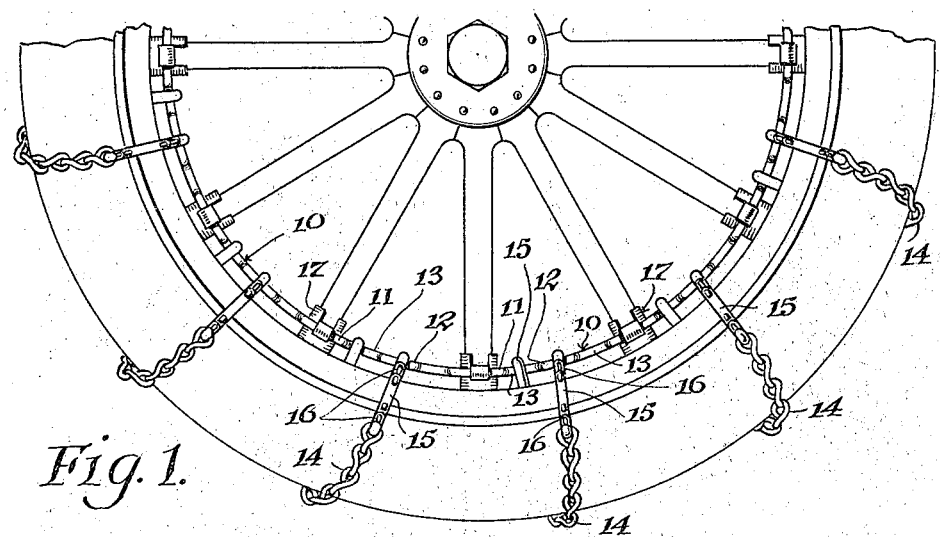
Figure 1 is a side elevation of a vehicle wheel having my anti-skid device applied thereto.
Figures 2, 3:
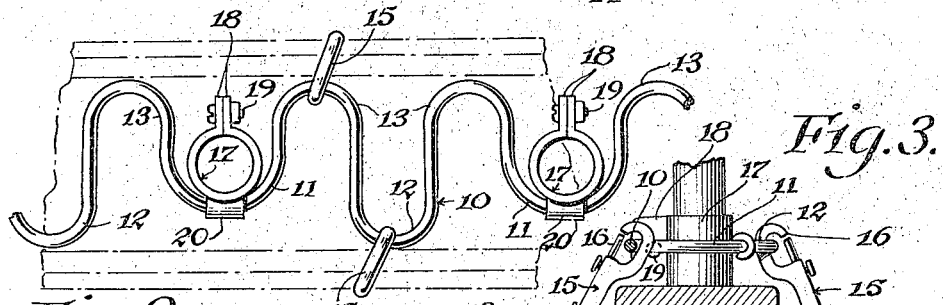
Figure 2 is a view looking toward the inside face of the chain holding member showing the inner face of the felly in dotted lines.
Figure 3 is a sectional view radial to the felly and tire, showing my device applied.
Figures 4, 5:
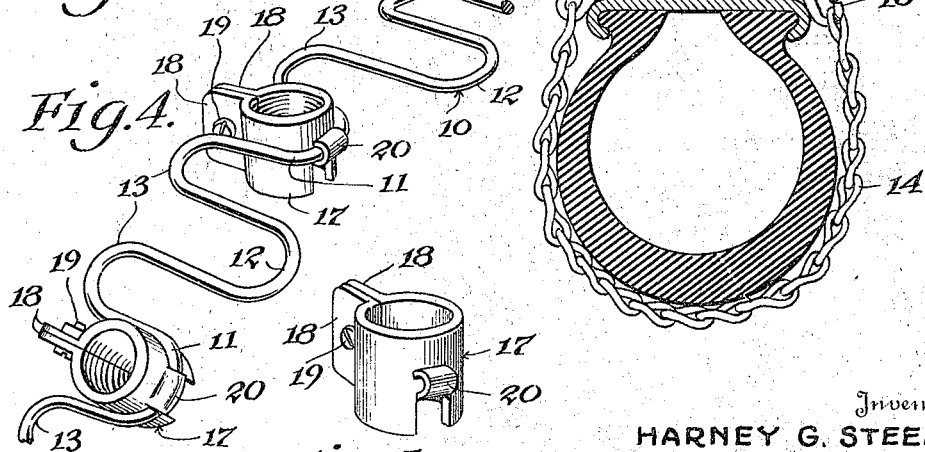
Figure 4 is a perspective view of a portion of the chain holding device detached.
Figure 5 is a perspective view of one of the cuffs.

Referring to these drawings, it will be seen that my device comprises an annular member, designated generally 10, which is formed of a single length of relatively heavy steel wire somewhat resilient, this wire being sinuously bent so as to provide a series of convolutions extending transverse to the plane of the annulus. As illustrated in Figure 2, these convolutions are so formed as to provide relatively wide but relatively shallow convolutions 11 designed to receive the spokes of the wheel and embrace these spokes and between these convolutions 11 are narrower but deeper convolutions 12, the convolutions 12 being connected to the convolutions 11 by the convolutions 13. Of course, it will be understood that the convolutions 11 and 12 and the convolutions 13 are integral and that the whole annulus is made of an integral piece of wire.

The ends of the annulus may be connected in any suitable manner. Thus the ends may be brazed, welded or clamped together and I do not wish to restrict myself to any particular means for connecting the ends of the wire forming the annulus. The annulus, when formed, is of such diameter that it may be disposed between the hub and felly of the wheel and preferably about one inch inside of the felly with the convolutions 11 embracing the spokes of the wheel and the convolutions 12 and 13 extending equi-distantly on each side of the middle plane of the wheel. The cross chains 14 are of any suitable or usual form but at their ends are engaged with double snap links 15, each of these links having a snap hook 16 at its opposite ends so that one of these snap hooks is engaged with the end link of the transverse chain 14 and the other snap hook is adapted to be engaged with the extremities of the convolutions 12 or 13.

For the purpose of holding the annulus 10 clamped to the spokes so that there will be no danger of any detachment, I preferably use cuffs 17 which are formed to embrace the spokes, these cuffs being split and yielding and formed with the outwardly projecting jaws 18 through which a bolt 19 passes. These are clamped upon the spokes and each of these cuffs is formed with a hook 20 which is engageable with the wire on which the annulus is formed by bending this hook 20 around the wire and clamping it securely. When it is desired to remove the annulus, these portions 20 are opened and then the annulus may be readily removed, but while the annulus is in place upon the wheel these hooks engage the annulus with the cuffs and the cuffs in turn are engaged firmly with the spokes of the wheel.

It will be noted from Figure 2, that the snap hook 16 forming one extremity of the cross link is engaged with the crest of the convolution 12, while the other hook 16 at the other extremity of the cross chain is connected with the crest of the convolution 13 so that the chain when in place extends over the tread face of the tire and extends at an angle less than a right angle to the medial plane of the tire. Thus these chains extending diagonally particularly tend to prevent lateral skidding of the wheel.

With this construction it will be seen that whenever it is desired to use anti-skid chains the cross chains may be readily connected to the convolutions 12 and 13 and that there will be no necessity of jacking up the car in order to put on a set of cross chains and that the cross chains may be put in place by merely snapping the hooks 16 into engagement with the convolutions 12 and 13. If by any chance any of the chains are slightly shorter than they should be, or for any other reason the cross chains are slightly difficult to fasten, it is possible to insert an instrument such as a screw driver beneath the convolution 12 or beneath the convolution 13 and the convolution may be lifted upward, that is toward the felly of the wheel, so as to readily snap the chain in place. The spoke-receiving convolutions 11 embrace the spoke firmly and resist any circumferential movement of the annulus with relation to the wheel. This movement is further resisted, of course, by the cuffs 17 and these cuffs 17 further prevent the annulus from becoming accidentally detached from the wheel. With this construction if a cross chain breaks or a link of this cross chain snaps, it is an easy matter to substitute another cross chain without removing the chain as a whole, whereas with most of the anti-skid chains now on the market the breakage of a cross chain necessitates that either an entirely new anti-skid chain shall be procured or that the snapped link of the cross chain shall be mended. In the latter case, of course, it is necessary to remove the entire tire chain to make the repair.

Attention is particularly called to the fact that the convolutions 12 and 13 extend equidistantly outward on each side of the medial plane of the wheel so that the cross chain is disposed evenly over the tread of the wheel with the middle of the cross chain approximately at the middle of the tread. If the annulus were disposed on one side of the wheel or to one side of the medial plane thereof and was not convoluted, the chain would not be evenly extended over the tire but the middle of the chain would be disposed to one side of the middle of the tread of the tire. The portion of the wire at the crests of the convolutions permits the cross chain to have a certain freedom of movement upon the tread surface of the tire so that this chain may shift over the tread surface of the tire or wear thereover when the wheel is being driven over a road so that the cross chain will not cut into the tire or unevenly wear the tire.

While I have illustrated a construction which is very simple, which may be cheaply made, which may be quickly applied, and which has been found thoroughly effective in service, I do not wish to be limited to the details of construction illustrated, as the convolutions might be varied in form in some respects without departing from the spirit of the invention. This is equally true of the particular form of the cuffs whereby the annulus 10 is held to the spokes and the particular form of the double snap hooks 15.

I claim:—

1. An anti-skid chain-holding device for vehicle wheels including an annulus convoluted parallel to its axis and transversely of its circumference, certain of the convolutions being formed to embrace the spokes of the wheel and certain of the convolutions being adapted to receive the ends of anti-skid cross chains.

2. An anti-skid chain-holding device for vehicle wheels comprising an annulus formed to provide a series of transversely extending convolutions, certain of the convolutions being formed to embrace the spokes of the vehicle wheel, means engaging the annulus with the spokes but preventing lateral displacement of the annulus relative to the spokes and certain of the convolutions being adapted to receive the ends of anti-skid cross chains.

3. An anti-skid chain-holding device for vehicle wheels comprising an annulus, the annulus being transversely convoluted, certain of the convolutions being formed to embrace the spokes of a wheel, split cuffs adapted to be applied to the spokes and clamped thereon and having pliable lugs adapted to embrace the material of the annulus whereby to clamp the annulus to the spokes and prevent lateral displacement of the annulus with reference to the spokes and certain of the convolutions being adapted to receive the ends of anti-skid cross chains.

4. An anti-skid chain-holding device for vehicle wheels including an annulus formed of resilient wire, the wire being convoluted transversely to the plane of the annulus, certain of the convolutions being relatively wide but short and being thereby adapted to embrace the spokes of the wheel, the convolutions between said spoke-engaging portions being relatively narrow but deep and extending equally on each side of the median plane of the annulus and certain of the convolutions being adapted to receive the ends of anti-skid cross chains, and means engaging the annulus whereby it may be held to the spokes of the wheel and prevented from lateral detachment.

5. As an article of manufacture, means for holding anti-skid cross chains in place upon a wheel comprising an annulus convoluted transversely to the plane of the annulus, certain of the convolutions being formed to embrace the spokes of a wheel and certain of the convolutions being adapted to receive the ends of anti-skid cross chains, and means coacting with the annulus whereby it may be held engaged with the spokes of the wheel and prevented from lateral detachment.

6. As an article of manufacture, means for holding anti-skid cross chains in place upon a wheel comprising an annulus convoluted transversely to the plane of the annulus, certain of the convolutions being formed to embrace the spokes of a wheel and certain of the convolutions being adapted to receive the ends of anti-skid cross chains, and means coacting with the annulus whereby it may be held engaged with the spokes of the wheel and prevented from lateral detachment, said means comprising a member adapted to clasp a wheel spoke and having a pliable portion adapted to be folded over and embrace the material of the annulus.

In testimony whereof I hereunto affix my signature.

HARNEY G. STEELE.